(12) United States Patent
Sanjeev et al.

(10) Patent No.: US 9,806,963 B2
(45) Date of Patent: Oct. 31, 2017

(54) FEATURE ACTIVATION ON DEVICE

(71) Applicant: Cellco Partnership, Basking Ridge, NJ (US)

(72) Inventors: Kumar Sanjeev, San Ramon, CA (US); Jignya Shah, Raritan, NJ (US); Keith P. Lampron, Lebanon, NJ (US); Seng Kin Liew, Johns Creek, GA (US)

(73) Assignee: Cellco Partnership, Basking Ridge, NJ (US)

( * ) Notice: Subject to any disclaimer, the term of this patent is extended or adjusted under 35 U.S.C. 154(b) by 606 days.

(21) Appl. No.: 14/057,606

(22) Filed: Oct. 18, 2013

(65) Prior Publication Data

US 2015/0113109 A1 Apr. 23, 2015

(51) Int. Cl.
| | |
|---|---|
| *G06F 15/173* | (2006.01) |
| *H04L 12/24* | (2006.01) |
| *H04L 29/08* | (2006.01) |
| *H04W 4/00* | (2009.01) |

(52) U.S. Cl.
CPC ........ *H04L 41/5051* (2013.01); *H04L 67/306* (2013.01); *H04W 4/001* (2013.01); *H04W 4/003* (2013.01)

(58) Field of Classification Search
USPC ................... 455/414.3, 551; 726/3
See application file for complete search history.

(56) References Cited

U.S. PATENT DOCUMENTS

| | | | | |
|---|---|---|---|---|
| 7,190,969 | B1* | 3/2007 | Oh .......................... | H04W 8/26 455/461 |
| 7,979,514 | B2* | 7/2011 | Mikan ................. | H04L 41/5054 455/414.1 |
| 8,700,022 | B1* | 4/2014 | Gilbert .................... | H04M 3/38 455/411 |
| 2003/0013434 | A1* | 1/2003 | Rosenberg ............. | G06Q 20/14 455/414.1 |
| 2004/0056890 | A1* | 3/2004 | Hao ...................... | G06F 9/4443 715/744 |
| 2008/0261569 | A1* | 10/2008 | Britt ..................... | G06Q 10/107 455/414.1 |
| 2008/0299938 | A1* | 12/2008 | Meshenberg .......... | G01C 21/20 455/343.2 |
| 2010/0099405 | A1* | 4/2010 | Brisebois ............ | H04L 41/0893 455/434 |
| 2010/0121736 | A1* | 5/2010 | Kalke ................... | G06Q 30/012 705/26.1 |
| 2011/0070877 | A1* | 3/2011 | Macaluso ......... | H04M 1/72525 455/419 |

(Continued)

*Primary Examiner* — Aftab N. Khan

(57) ABSTRACT

A system is configured to receive account information associated with a subscriber and a set of user devices, and receive user input, from a device associated with the subscriber, indicating that a feature is to be activated for the set of user devices. The device is configured to determine an association between the set of user devices and a feature code associated with the feature. The device is configured to receive a request to activate the feature from a user device, of the set of user devices, and determine that the user device is eligible to receive the feature based on the association between the set of user devices and the feature code. The device is configured to activate the feature for the user device based on determining that the user device is eligible to receive the feature.

20 Claims, 12 Drawing Sheets

(56) References Cited

U.S. PATENT DOCUMENTS

| | | | |
|---|---|---|---|
| 2011/0159843 A1* | 6/2011 | Heath | H04W 8/18 455/411 |
| 2011/0252457 A1* | 10/2011 | Srivastava | H04L 67/16 726/3 |
| 2012/0011020 A1* | 1/2012 | Saedifaez | G06Q 10/06 705/26.5 |
| 2012/0122437 A1* | 5/2012 | Zimmerman | H04W 8/22 455/414.3 |

* cited by examiner

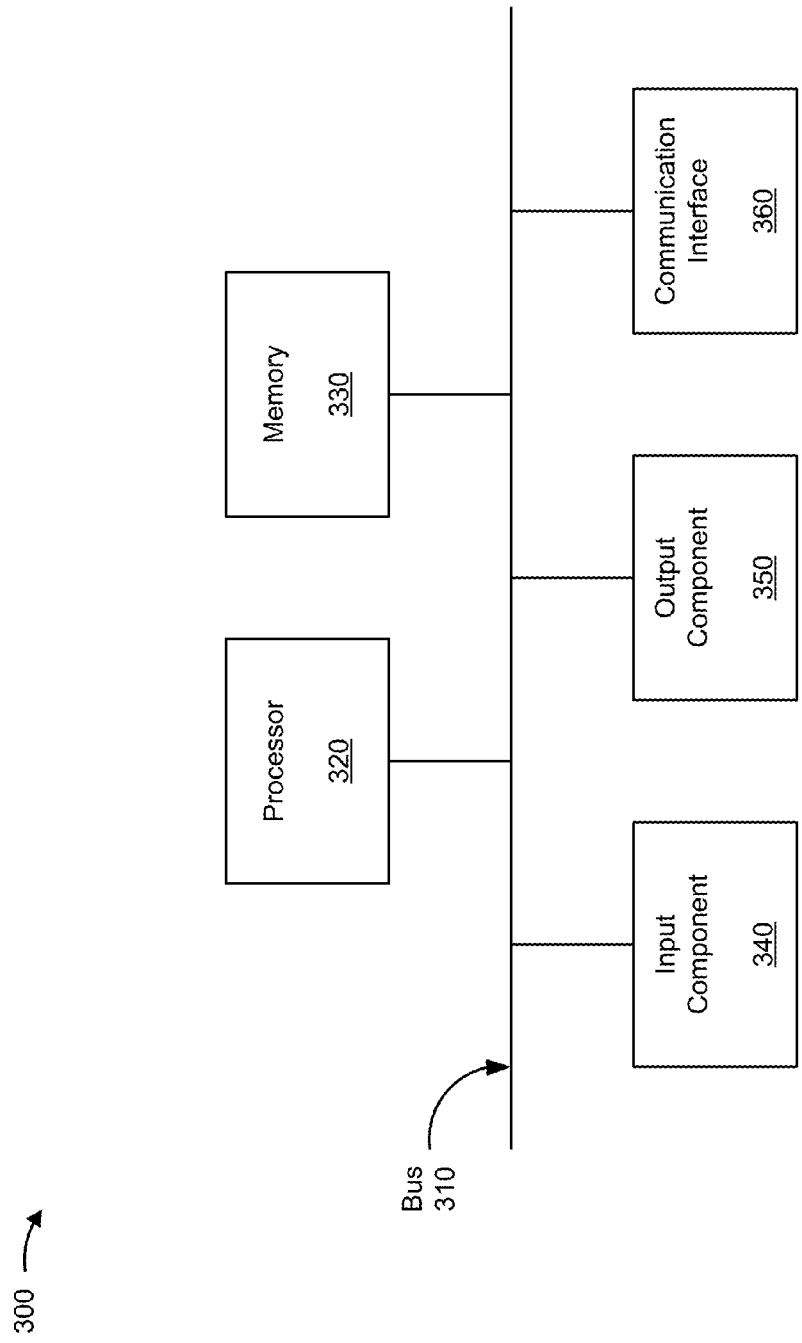

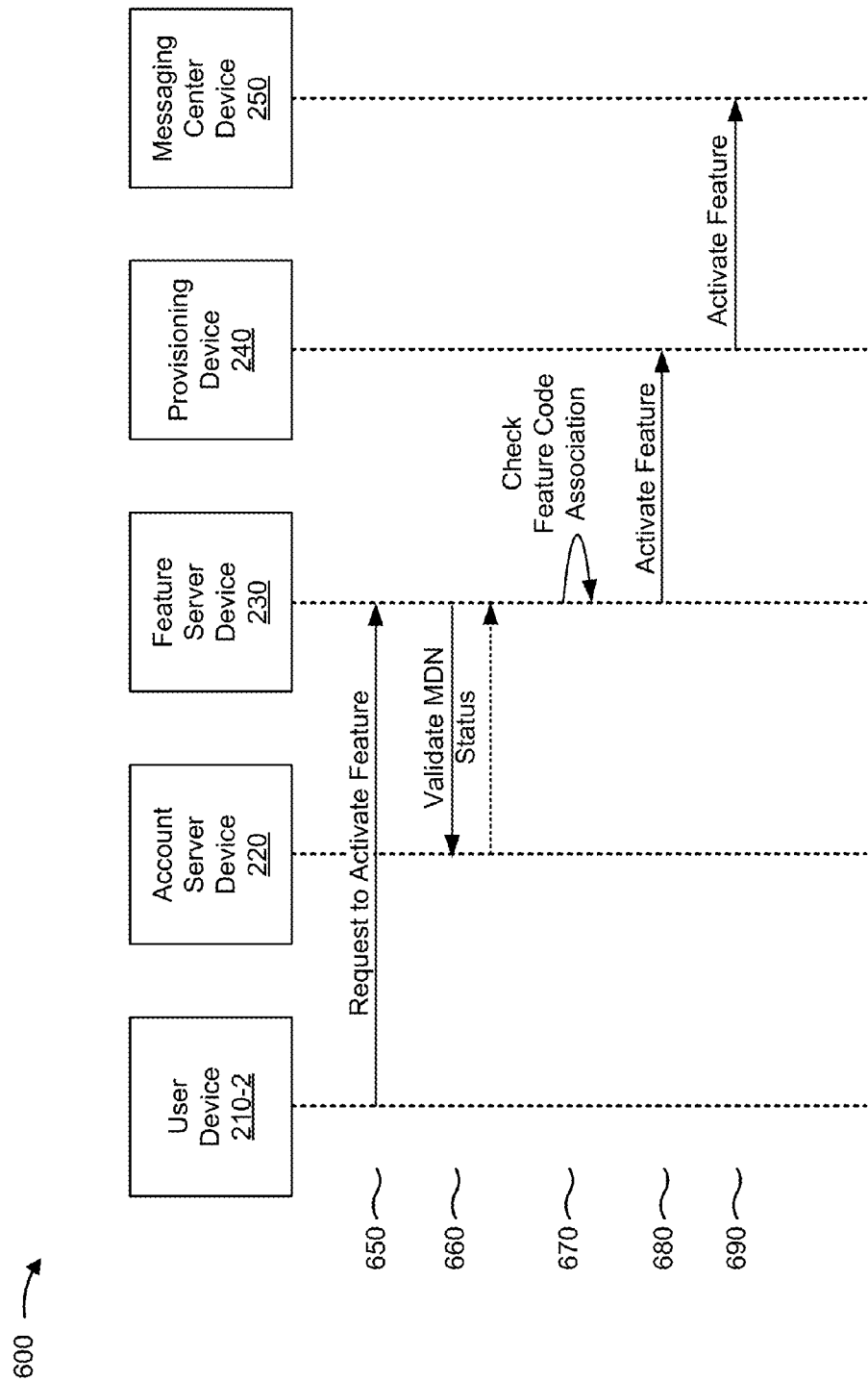

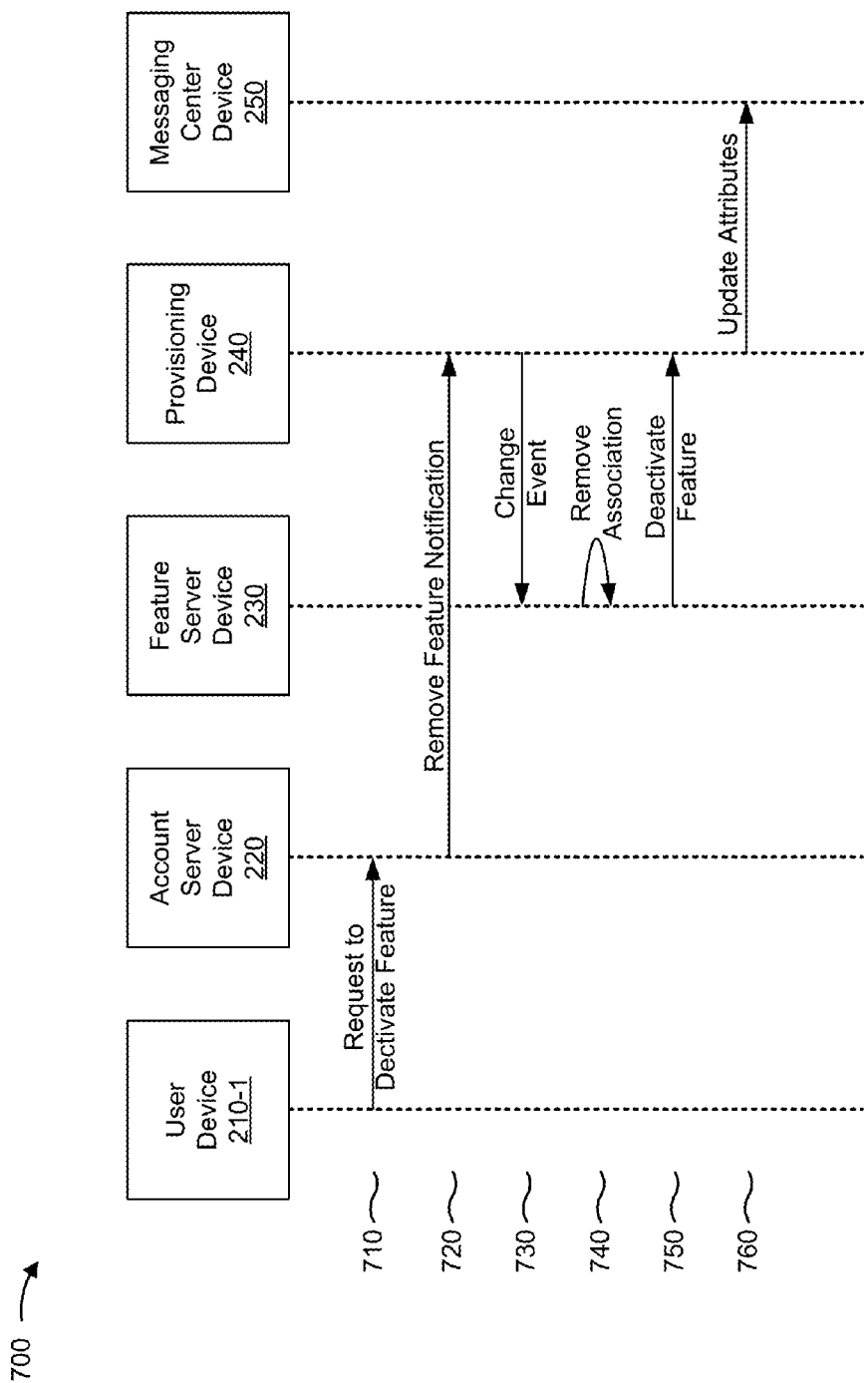

FEATURE ACTIVATION ON DEVICE

BACKGROUND

A service provider may provide a service (e.g., a telephone service, a cellular service, an internet service, etc.) to a subscriber. The subscriber may be associated with an account (e.g., a service provider account). The account may be associated with multiple user devices (e.g., smartphones, cellular telephones, computers, etc.) to receive the service.

BRIEF DESCRIPTION OF THE DRAWINGS

FIG. 3 is a diagram of example components of one or more devices of FIG. 2;

FIGS. 6A-6B are diagrams of an example call flow for activating a feature for a user device of a set of user devices;

FIG. 7 is a diagram of an example call flow for deactivating a feature for a user device of a set of user devices.

DETAILED DESCRIPTION OF PREFERRED EMBODIMENTS

The following detailed description of example implementations refers to the accompanying drawings. The same reference numbers in different drawings may identify the same or similar elements.

A service provider may provide a service (e.g., a telephone service, a cellular service, an internet service, etc.) to a subscriber. The subscriber may be associated with multiple user devices to receive the service. For example, the subscriber may be associated with a business, and the set of user devices may be associated with employees of the business. The subscriber may desire to add a feature for some or all of the set of user devices (e.g., to permit some or all of the employees to use the feature). The feature may include an additional service to be used by the set of user devices.

However, adding a feature may be inconvenient for the subscriber. For example, the service provider may provision a network (e.g., a service provider network) to activate a set of features (e.g., all available features) for the set of user devices. In this instance, the subscriber may need to block a quantity of undesired features for the set of user devices as opposed to merely adding desired features. Thus, blocking undesired features may be cumbersome for the subscriber in instances where there is a large quantity of undesired features and/or a large quantity of user devices. Implementations described herein may allow a subscriber to add and/or remove features for a set of user devices, and may permit a service provider to provision one or more network devices to provide the service to the set of user devices.

Figure 1:
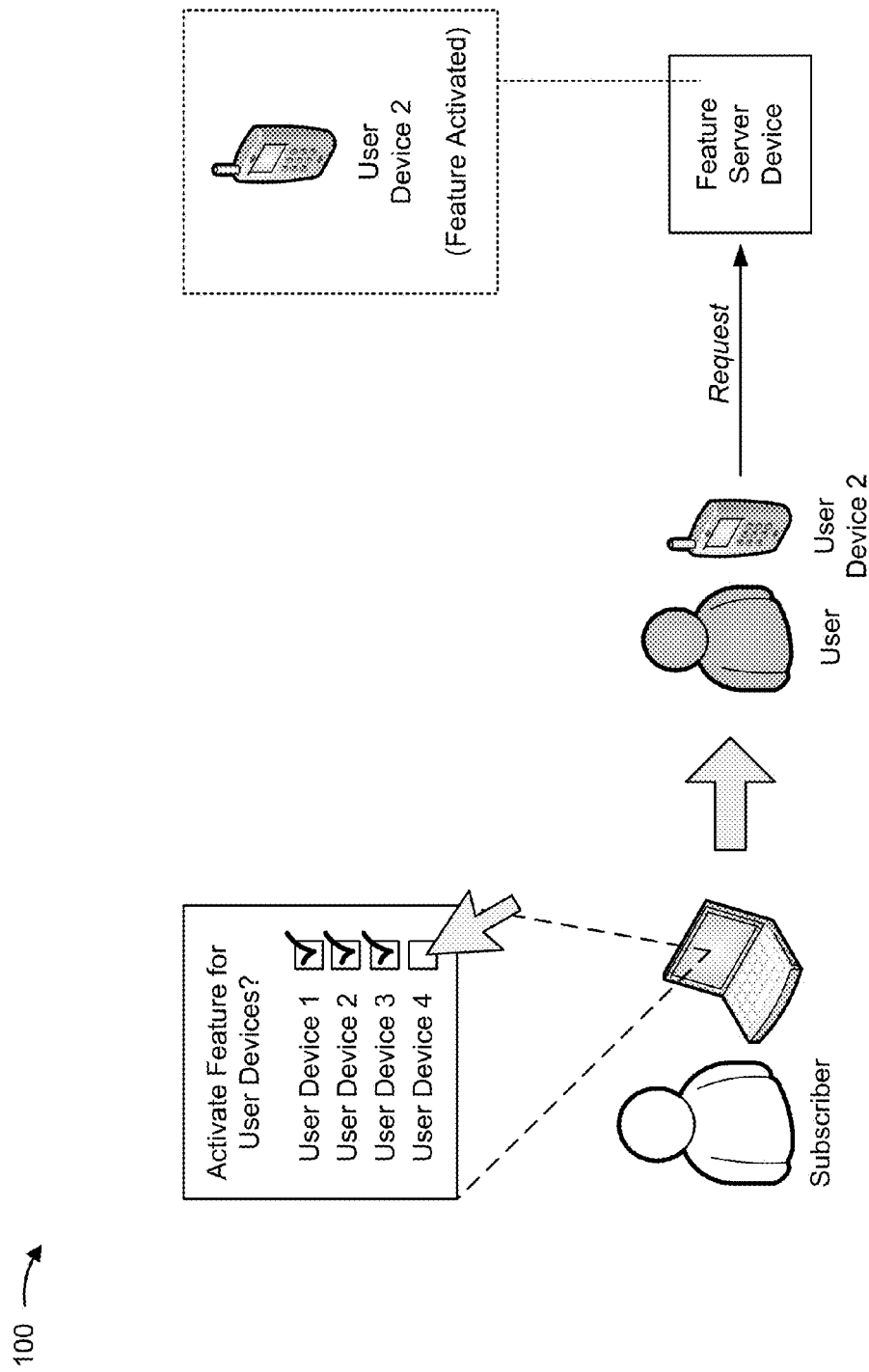
FIG. 1 is a diagram of an overview of an example implementation described herein.

FIG. 1 is a diagram of an overview of an example implementation 100 described herein. As shown in FIG. 1, example implementation 100 may include a subscriber, a user, a user device, and a feature server device.

As shown in FIG. 1, a subscriber (e.g., to a cellular telephone service) may access an account (e.g., a service provider account), and may view information that identifies a set of user devices (e.g., cellular telephones, tablet computers, desktop computers, or the like) associated with the account. The set of user devices may include a first user device (e.g., "User Device 1"), a second user device (e.g., "User Device 2"), a third user device (e.g., "User Device 3"), and a fourth user device (e.g., "User Device 4"). The subscriber may provide user input indicating that the set of user devices may have access to a feature. The feature may include an additional service associated with the service provider account.

As further shown in FIG. 1, a user of one of the user devices (e.g., a user of the second user device) may provide a request, to use the feature, to the feature server device. Based on the request to use the feature, and based on the indication (e.g., provided by the subscriber) that the second user device may receive the feature (e.g., that the second user device is one of the set of user devices authorized to receive the feature), the feature server device may activate the feature for the second user device. In this manner, the subscriber may add features to user devices associated with the account to cause a feature server device to provide a service (e.g., associated with the feature) to a user device of the set of user devices.

Figure 2:
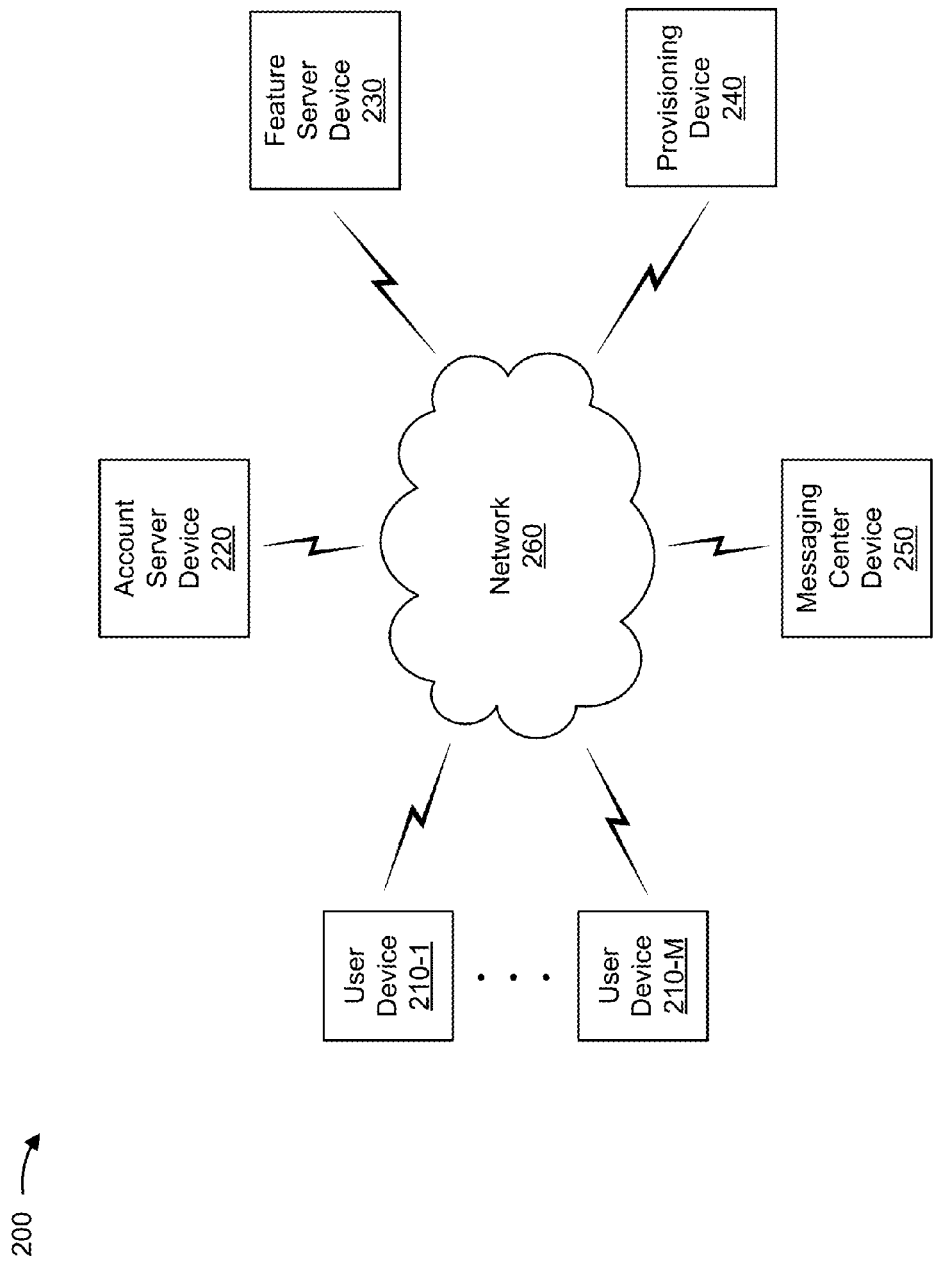
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 210-1 . . . 210-M (M≥1) (hereinafter referred to collectively as "user devices 210," and individually as "user device 210"), an account server device 220, a feature server device 230, a provisioning device 240, a messaging center device 250, and a network 260. Devices of environment 200 may interconnect via wired connections, wireless connections, or a combination of wired and wireless connections.

User device 210 may include a device capable of sending and/or receiving information associated with a service (e.g., a telephone service, a cellular service, an internet service, etc.). For example, user device 210 may include a cellular telephone, a smartphone, a computing device (e.g., a desktop computer, a laptop computer, a tablet computer, a handheld computer, etc.), or a similar device. User device 210 may receive information from and/or transmit information to account server device 220, feature server device 230, provisioning device 240, and/or messaging center device 250.

Account server device 220 may include a device capable of receiving, processing, storing, and/or providing information, such as information associated with a service provider account. For example, account server device 220 may include one or more computation or communication devices, such as a server device. Account server device 220 may receive information from and/or transmit information to user device 210, feature server device 230, provisioning device 240, and/or messaging center device 250.

Feature server device 230 may include a device capable of receiving, processing, storing, and/or providing information, such as information associated with a feature. For example, feature server device 230 may include one or more computation or communication devices, such as a server device. Feature server device 230 may receive information from and/or transmit information to user device 210, account server device 220, provisioning device 240, and/or messaging center device 250.

Provisioning device 240 may include a device capable of provisioning a network to provide a service associated with a feature. For example, provisioning device 240 may include a computing device (e.g., a server, a desktop computer, a laptop computer, a tablet computer, a handheld computer, etc.), a network device (e.g., a gateway, a base station, etc.), or a similar device. Provisioning device 240 may receive information from and/or transmit information to user device 210, account server device 220, feature server device 230, and/or messaging center device 250.

Messaging center device 250 may include a device capable of directing a message to a receiving device via a network (e.g., network 260). For example, messaging center device 250 may include a short message service center ("SMSC"), a multimedia message service center ("MSMC"), an email server, an instant messaging server, or a similar device. Messaging center device 250 may receive information from and/or transmit information to user device 210, account server device 220, feature server device 230, and/or provisioning device 240.

Network 260 may include one or more wired and/or wireless networks. For example, network 260 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, server device 220 and feature server device 230 may be implemented as a single server device, or may be implemented as a collection of server devices. Additionally, one or more of the devices of environment 200 may perform one or more functions described as being performed by another one or more devices of environment 200.

FIG. 3 is a diagram of example components of a device 300. Device 300 may correspond to user device 210, account server device 220, feature server device 230, provisioning device 240, and/or messaging center device 250. Additionally, or alternatively, each of user device 210, account server device 220, feature server device 230, provisioning device 240, and/or messaging center device 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4A:
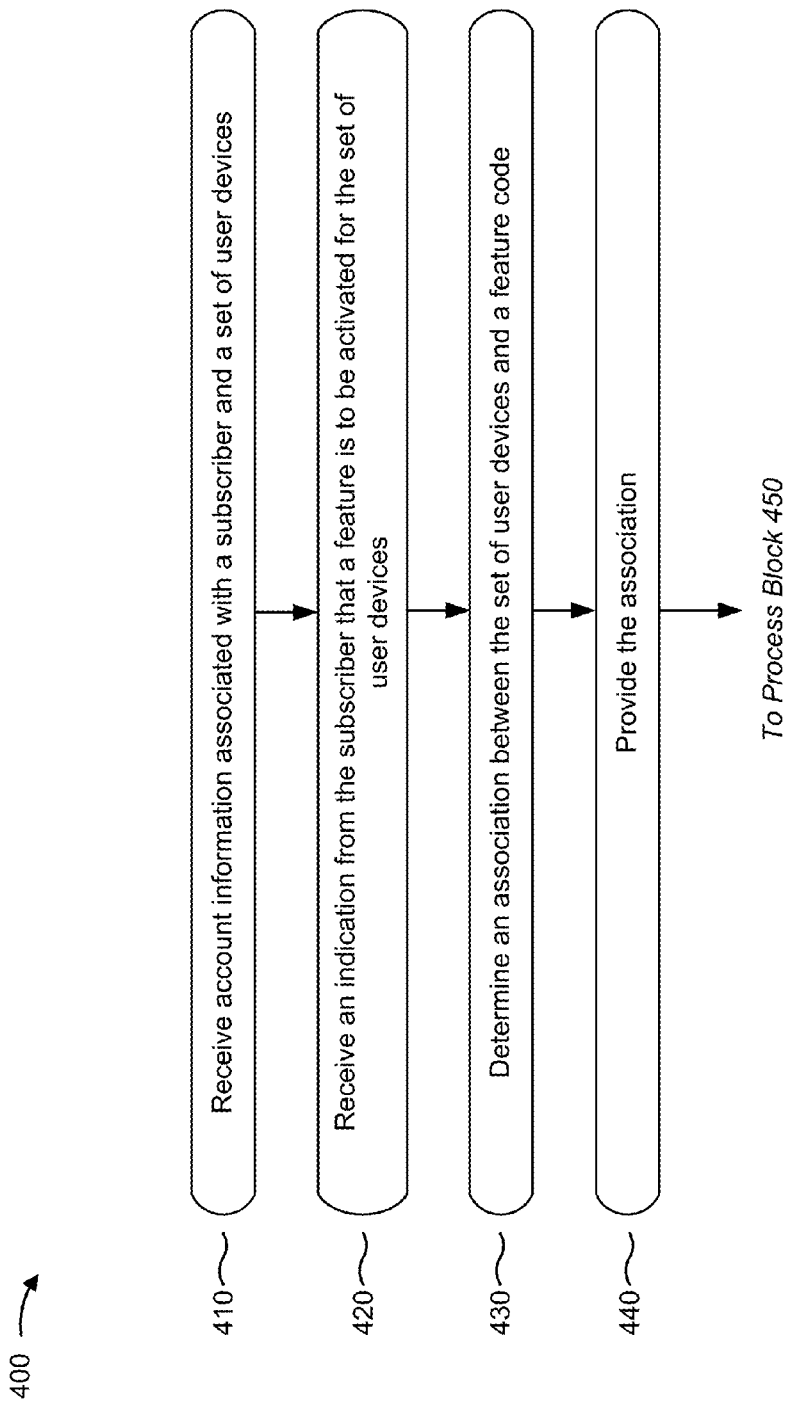
FIGS. 4A-4B are flow charts of an example process for activating a feature for a user device of a set of user devices.
Figure 4B:
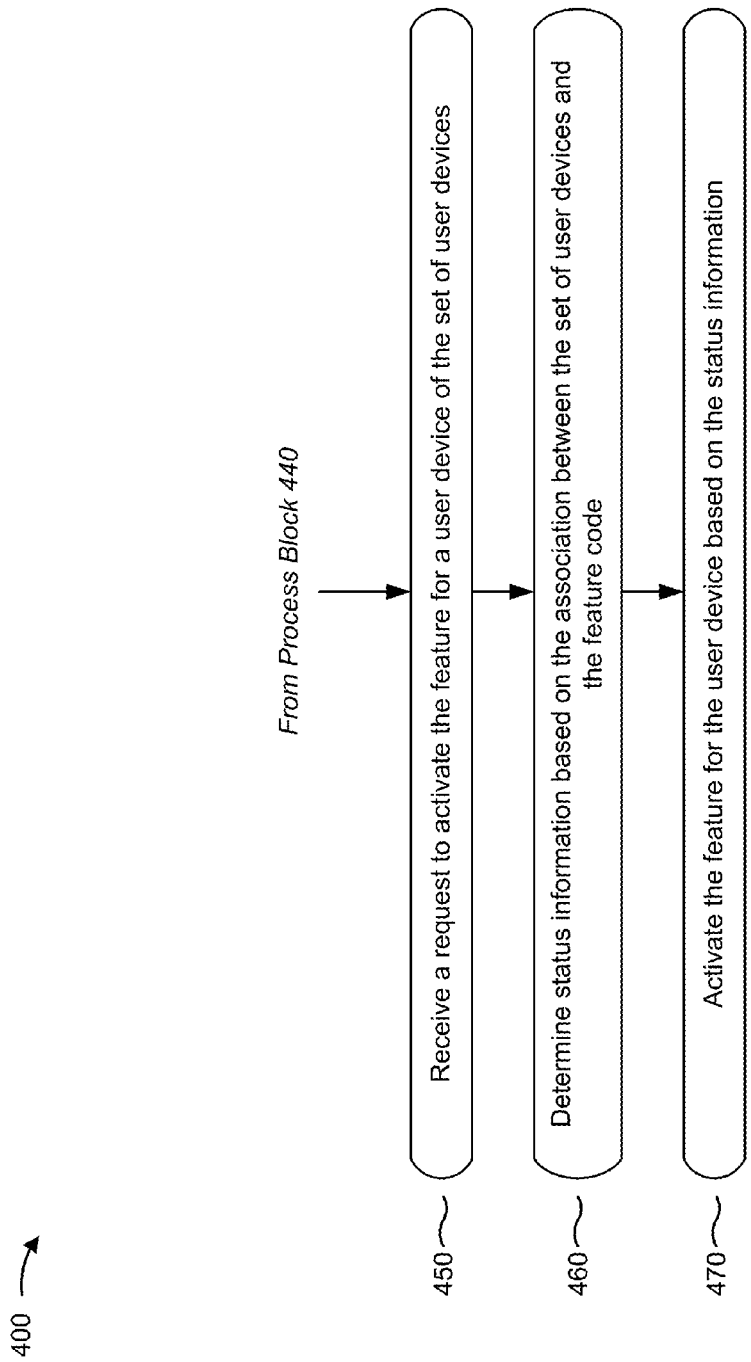

FIGS. 4A-4B are flow charts of an example process 400 for activating a feature for a user device of a set of user devices. In some implementations, one or more process blocks of FIG. 4A may be performed by account server device 220. In some implementations, one or more process blocks of FIG. 4B may be performed by feature server device 230. Additionally, or alternatively, one or more process blocks of FIGS. 4A-4B may be performed by another device or a group of devices separate from or including account server device 220 and/or feature server device 230, such as user device 210, provisioning device 240, and/or messaging center device 250.

As shown in FIG. 4A, process 400 may include receiving account information associated with a subscriber and a set of user devices (block 410). For example, account server device 220 may receive the account information from user device 210, feature server device 230, provisioning device 240, and/or messaging center device 250.

In some implementations, the subscriber may include a user (e.g., of user device 210) that is receiving a service (e.g., a telephone service, a cellular service, an internet service, etc.) from a service provider (e.g., a telephone service provider, a cellular service provider, an internet service provider, etc.). For example, the subscriber may include a user that has purchased a service (e.g., cellular telephone service) for the set of user devices 210. In some implementations, the subscriber may be associated with a business entity, and the set of user devices 210 may be associated with employees of the business entity.

In some implementations, the account information may include information that allows the subscriber to receive the service. For example, the account information may include information that identifies the subscriber (e.g., a subscriber name, an account number, etc.), information that permits the subscriber to access an account associated with the service (e.g., a username, a password, etc.), information associated with a cost of the service (e.g., a price of the service, a time period for the service, etc.), or the like.

In some implementations, the account information may identify the set of user devices 210 associated with the account. For example, the account information may include a set of device identifiers associated with the set of user devices 210. In some implementations, a device identifier, of the set of devices identifiers, may include a set of characters (e.g., numbers, letters, symbols, etc.) that uniquely identifies user device 210. For example, the device identifier may include a mobile device number ("MDN"), a telephone number, an internet protocol ("IP") address, or the like.

In some implementations, the subscriber may provide the account information via user input. For example, the subscriber may provide the account information, via user input, to user device 210, and user device 210 may provide the account information to account server device 220, feature server device 230, provisioning device 240, and/or messaging center device 250. Additionally, or alternatively, the subscriber may provide the account information to a customer service representative (e.g., associated with the service provider), and the customer service representative may provide the account information, via a computing device, to account server device 220, feature server device 230, provisioning device 240, and/or messaging center device 250.

In some implementations, one or more devices of environment 200 (of FIG. 2) may receive the account information by accessing the account information stored in a data structure (e.g., a data structure associated with account server device 220, feature server device 230, provisioning device 240, and/or messaging center device 250).

As further shown in FIG. 4A, process 400 may include receiving an indication from the subscriber that a feature is to be activated for the set of user devices (block 420). For example, the subscriber may access the account (via the username and password) by use of user device 210. The subscriber may provide user input that identifies the feature and the set of user devices 210. In some implementations, user device 210 may provide the user input to account server device 220. Additionally, or alternatively, user device 210 may provide the user input to feature server device 230, provisioning device 240, and/or messaging center device 250.

In some implementations, the feature may include an additional service (e.g., an additional function) related to the service associated with the account. For example, the service may include a cellular service, and the feature may include an additional service related to the cellular service, such as voicemail, email, short message service ("SMS") text messaging, call forwarding, conference calling, call blocking, or the like. Based on receiving the indication that the feature is to be activated for the set of user devices, account server device 220 may determine that the set of user devices 210 are to receive the additional service (e.g., may receive voicemail, email, SMS text messages, call forwarding, conference calling, call blocking, etc.).

In some implementations, the feature may include access to additional ringtones, additional screensavers, or the like. Additionally, or alternatively, the feature may include access to media (e.g., media downloads, media broadcasts, etc.), such as music, pictures, video, or the like. In some implementations, the feature may include access to a navigation system (e.g., based on global positioning system ("GPS") signals). Additionally, or alternatively, the feature may include a data limit (e.g., a quantity of data traffic user device 210 may receive and/or transmit during a period of time). In some implementations, the feature may include an ability to make and/or receive international calls. Additionally, or alternatively, the feature may include caller identification.

In some implementations, the feature may include access to a shared messaging service. The shared messaging service may permit messages (e.g., SMS text messages, instant messages, emails, etc.) transmitted and/or received by a first user device 210-1, to be received by a set of user devices 210 (e.g., the set of user devices 210 associated with the subscriber). Additionally, or alternatively, the shared messaging service may permit a user of user devices 210 to access messages received and/or transmitted by user device 210 from another device (e.g., another cellular telephone, another computer, etc.). For example, the user may access feature server device 230 (e.g., via an account associated with the user) to access messages received by user device 210.

In some implementations, account server device 220 may receive an indication that the feature is to be activated for all of the set of user devices 210. For example, account server device 220 may receive a single request (e.g., based on a single interaction of the subscriber) to activate the feature for all user devices 210.

In some implementations, account server device 220 may receive an indication that the feature is to be activated for a subset of user devices 210 of the set of user devices 210. For example, the subscriber may select a portion of the set of user devices 210 (e.g., a portion of user devices 210 associated with the account, such as user devices 210 associated with a department of a business) to be associated with the feature. Based on receiving the indication, account server device 220 may determine that the feature may be activated for the portion of the set of user device 210.

In some implementations, account server device 220 may activate different features for different portions of user devices 210 (e.g., may activate a first feature for a first subset of user devices 210 and a second feature for a second subset of user devices 210) based on receiving the indication.

In some implementations, the set of user devices 210 may be associated with a default set of features. For example, user devices 210 may be associated with no features by default, and account server device 210 may activate only those features indicated by the subscriber (e.g., via user input). Additionally, or alternatively, the default set of features may include some features (e.g., a basic set of features, a premium set of features, etc.), and account server device 210 may receive an indication that additional features are to be activated.

As further shown in FIG. 4A, process 400 may include determining an association between the set of user devices and a feature code (block 430). For example, account server device 220 may determine the association between user devices 210 and the feature code associated with the feature. Additionally, or alternatively, the association may be determine by user device 210, feature server device 230, provisioning device 240, and/or messaging center device 250.

In some implementations, the feature code may include an identifier that uniquely identifies the feature. For example, the feature code may include one or more characters (e.g., letters, numbers, symbols, or the like). In some implementations, account server device 220 may determine the feature code based on the feature identified by the subscriber. For example, account server device 220 may store a list of features and associated feature codes (e.g., in a data structure associated with account server device 220). Based on the indication associated with the subscriber, account server device 220 may access the list of features to determine a particular feature code associated with the feature to be activated. Additionally, or alternatively, account server device 220 may automatically generate the feature code.

In some implementations, account server devices 220 may determine an association between the set of user device 210 and the feature code. For example, account server device 220 may associate the feature code with the device identifiers associated with the set of user devices 210. Additionally, or alternatively, account server device 220 may associated the feature code with a portion of the set of user devices 210 (e.g., the portion of user devices 210 for which the feature is to be activated).

In some implementations, the device identifiers may include a set of MDNs associated with the set of user devices 210. Account server device 220 may associate the feature code with each MDN, of the set of MDNs. In some implementations, account server device 220 may store the association between the feature code and the set of MDNs in a data structure (e.g., associated with account server device 220).

As further shown in FIG. 4A, process 400 may include providing the association (block 440). For example, account server device 220 may provide the association to feature server device 230, provisioning device 240, and/or messaging center device 250.

In some implementations, account server device 220 may provide a feature notification to provisioning device 240. The feature notification may include the association between the feature code and the set of user devices 210, and may indicate that the feature may be activated for the set of user devices 210. Based on receiving the feature notification, provisioning device 240 may provide a notification to feature server device 230 indicating that the feature may be activated for the set of user devices 210 (e.g., indicating that feature server device 230 may provide a service, associated with the feature, to user device 210).

In some implementations, account server device 220 may provide the association to cause feature server 230, provisioning device 240, and/or messaging center device 250 to provide the service to the set of user devices 210 (e.g., to activate the feature). Additionally or alternatively, feature server 230, provisioning device 240, and/or messaging center device 250 may receive the association, and may not activate the feature until receiving additional information (e.g., a request by a user of user device 210 to activate the feature, an assent by the user of user device 210 to terms and conditions associated with the feature, etc.) as further discussed herein.

In some implementations, account server device 220 may provide a notification (e.g., an email, an SMS text message, etc.) to user devices 210 indicating that the feature may be activated for user devices 210. Additionally, or alternatively, a first user device 210-1 (e.g., associated with the subscriber) may provide the notification to a remaining set of user devices 210.

As shown in FIG. 4B, process 400 may include receiving a request to activate the feature for a user device of the set of user devices (block 450). For example, user device 210 (e.g., of the set of user devices 210) may provide a request, to feature server 230, to activate the feature.

In some implementations, user device 210 may provide the request based on user input. For example, a user of user device 210 may provide user input (e.g., via a user interface) requesting to use the feature. Based on the user input, user device 210 may send the request to feature server 230. In some implementations, the request may include an assent to terms and conditions associated with the feature.

In some implementations, user device 210 may provide the request based on an attempt by a user of user device 210 to use the feature. For example, user device 210 may receive user input to activate a program (e.g., an application) associated with the feature (e.g., a GPS navigation application). Based on activating the program, user device 210 may provide a request, to feature server 230, to activate the feature (e.g., to access a navigation system).

As further shown in FIG. 4B, process 400 may include determining status information based on the association between the set of user devices and the feature code (block 460). For example, feature server device 230 may determine the status information based on the association between the set of user devices 210 and the feature code.

In some implementations, the status information may include information that identifies whether user device 210 is eligible for the feature. In some implementations, feature server device 230 may determine the status information based on determining whether user device 210 is associated with an account type (e.g., a business account, a private account, etc.). For example, feature server device 230 may query account server device 220, and may receive a notification that user device 210 is associated with a business account (e.g., a business account associated with the subscriber).

In some implementations, feature server device 230 may determine the status information by determining whether the device identifier (e.g., associated with user device 210) is associated with the feature code. For example, user device 210 may be associated with an MDN. Feature server device 230 may access the association between the feature code and a set of MDNs (e.g., stored in a data structure associated with feature server device 230), and may determine that the MDN is associated with the feature code.

In some implementations, based on the status information, feature server device 230 may determine that user device 210 is not eligible for the feature. For example, feature server device 230 may determine that the MDN is not associated with the feature code. In some implementations, feature server device 230 may provide a notification to user device 210 (e.g., an email, an SMS text message, etc.) indicating that user device 210 is not eligible for the feature. Additionally, or alternatively, feature server device 230 may provide the notification to a particular user device 210 associated with the subscriber indicating that one or more user devices 210, of the set of user devices 210, has attempted to activate the feature.

As further shown in FIG. 4B, process 400 may include activating the feature for the user devices based on the status information (block 470). For example, feature server device 230 may activate the feature for user device 210 by sending a notification to provisioning device 240 indicating that the feature may be activated for user device 210. Based on the notification, provisioning device 240 may provision network 260 so as to permit user device 210 to use the feature. In some implementations, feature server device 230 and/or provisioning device 240 may send a notification to messaging center device 250 indicating that the feature may be activated for user device 210. Additionally, or alternatively, feature server device 230 may send a notification, to a particular user device 210 associated with the subscriber, indicating that the feature is activated for user device 210.

In some implementations, the feature may include access to a shared messaging service, and feature server device 230 may send a notification to provisioning device 240 to cause provisioning device 240 to activate the shared messaging service for user device 210. Additionally, or alternatively, feature server device 230 and/or provisioning device 240 may send a notification to messaging center device 250 to cause messaging center device 250 to activate the shared messaging service for user device 210 (e.g., to cause messaging center device 250 to provide messages, received and/or transmitted by user device 210, to feature server device 230 to permit the user to access the messages via another device).

Although FIGS. 4A-4B show example blocks of process 400, in some implementations, process 400 may include additional blocks, fewer blocks, different blocks, and/or differently arranged blocks than those depicted in FIGS. 4A-4B. Additionally, or alternatively, two or more of the blocks of process 400 may be performed in parallel.

Figure 5:
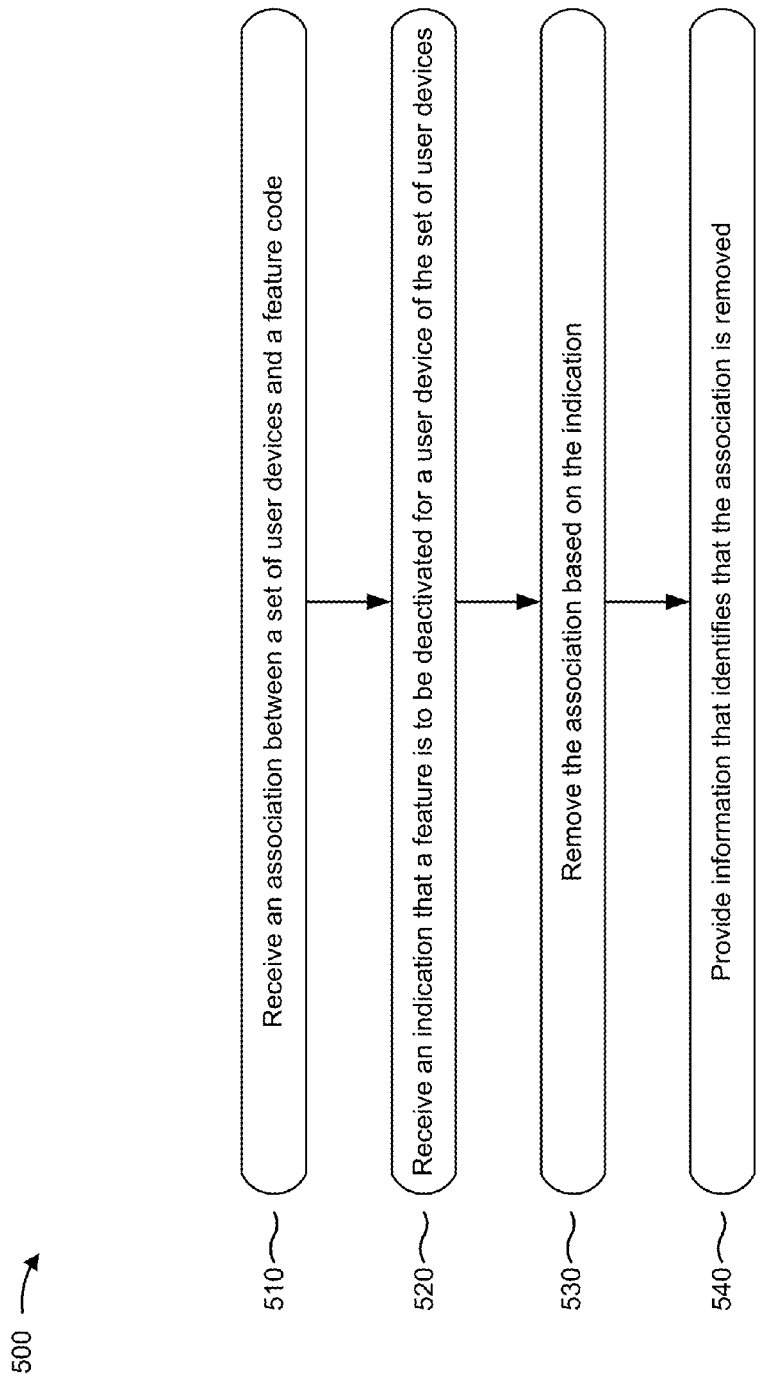
FIG. 5 is a flow chart of an example process for deactivating a feature for a user device of a set of user devices.

FIG. 5 is a flow chart of an example process 400 for deactivating a feature for a user device. In some implementations, one or more process blocks of FIG. 5 may be performed by account server device 220. Additionally, or alternatively, one or more process blocks of FIG. 5 may be performed by another device or a group of devices separate from or including feature server device 230, such as user device 210, feature server device 230, provisioning device 240, and/or messaging center device 250.

As shown in FIG. 5, process 500 may include receiving an association between a set of user devices and a feature code (block 510). For example, account server device 220 may receive an association between a set of user devices 210 and a feature code associated with a feature. In some implementations, the association may include an association between a set of MDNs (associated with the set of user devices 210) and the feature code.

In some implementations, the association may be stored in a data structure (e.g., associated with account server device 220), and account server device 220 may receive the association by accessing the association in the data structure. Additionally, or alternatively, account server device 220 may receive the association from user device 210, feature server device 230, provisioning device 240, and/or messaging center device 250.

As further shown in FIG. 5, process 500 may include receiving an indication that a feature is to be deactivated for a user device of the set of user devices. (block 520). For example, a first user device 210-1, of the set of user devices 210, may provide a notification to account server device 220. The notification may indicate that the feature is to be removed from a second user device 210-2 of the set of user devices 210 (e.g., that second user device 210-2 may no longer have access to a service associated with the feature).

In some implementations, account server devices 220 may receive the indication based on user input. For example, a subscriber (e.g., associated with a business entity) may provide user input indicating that the feature is to be removed for a particular user device 210 (e.g., associated with a particular employee of the business entity). In some implementations, the subscriber may provide the indication by accessing an account (e.g., a service provider account) associated with a service (e.g., a telephone service, a cellular service, an internet service, etc.).

In some implementations, account server device 220 may receive an indication that the feature is to be deactivated for all user devices 210 of the set of user devices 210. Additionally, or alternatively, account server device 220 may receive an indication that the feature is to be deactivated for a subset of the set of user devices 210 (e.g., fewer than all user devices 210).

As further shown in FIG. 5, process 500 may include removing the association based on the indication (block 530). For example, account server device 220 may remove the association between user device 210 and the feature code. In some implementations, account server device 220 may remove the association by removing an MDN associated with user device 210 from the set of MDNs associated with the feature code. Additionally, or alternatively, account server device 220 may erase the association between user device 210 and the feature code from a data structure (e.g., associated with account server device 220).

As further shown in FIG. 5, process 500 may include providing information that identifies that the association is removed (block 540). For example, account server device 220 may provide a notification to feature server device 230, provisioning device 240, and/or messaging center device 250. The notification may indicate that the association between user device 210 and the feature code may be removed.

In some implementations, based on the notification, feature server device 230, provisioning device 240, and/or messaging center device 250 may remove the association by erasing the association stored in a data structure (e.g., a data structure associated with feature server device 230, provisioning device 240, and/or messaging center device 250). Additionally, or alternatively, based on the notification, feature server device 230, provisioning device 240, and/or messaging center device 250 may block the feature for user device 210 (e.g., may prevent user device 210 from accessing the feature).

In some implementations, account server device 220 may send a message (e.g., an SMS text message, an email, etc.) to user device 210 indicating that user device 210 may no longer use the feature.

Although FIG. 5 shows example blocks of process 500, in some implementations, process 500 may include additional blocks, fewer blocks, different blocks, and/or differently arranged blocks than those depicted in FIG. 5. Additionally, or alternatively, two or more of the blocks of process 500 may be performed in parallel.

Figure 6A:
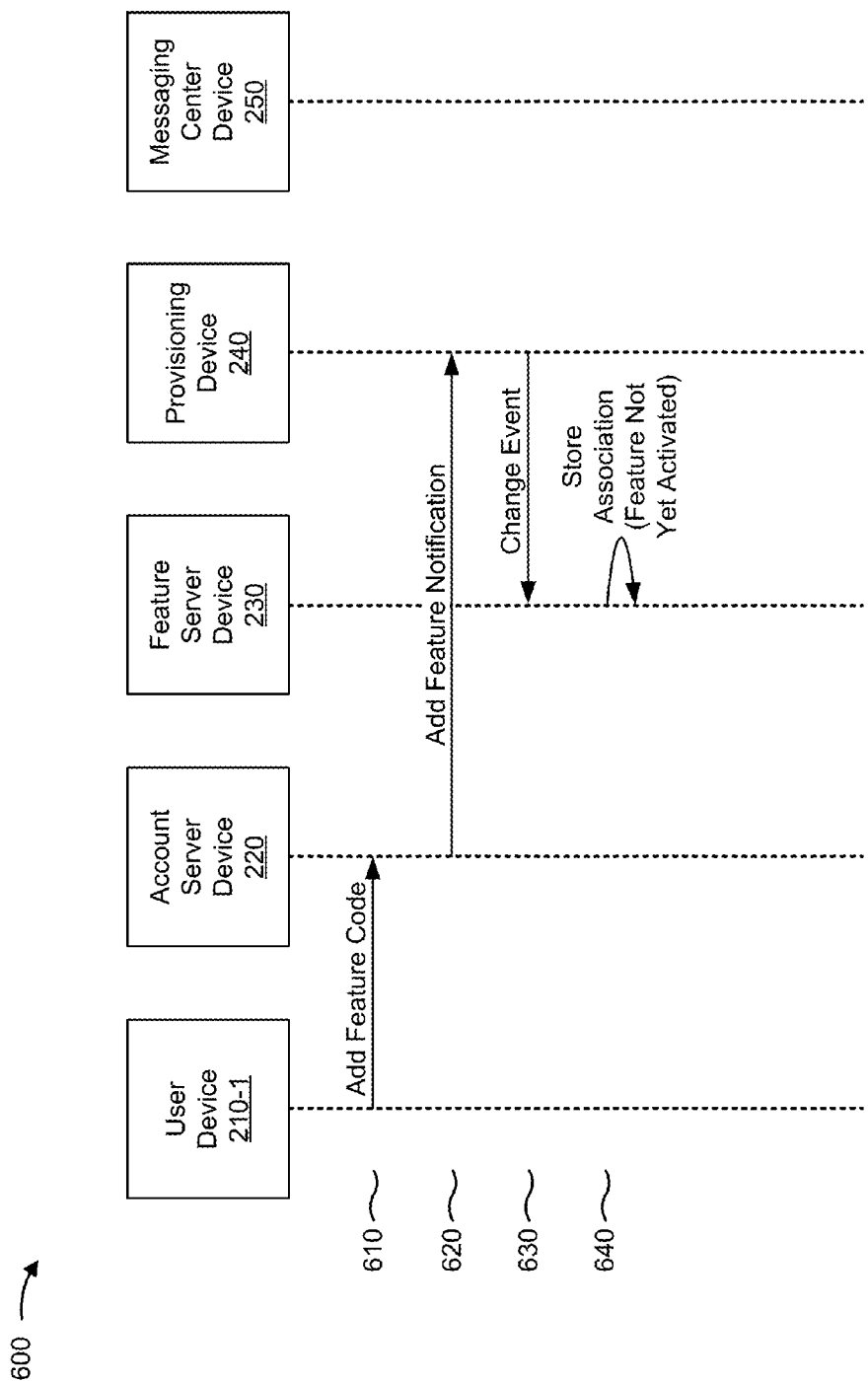

FIGS. 6A-6B are diagrams of an example call flow 600 for activating a feature for user device 210 of the set of user devices 210 associated with the subscriber. Assume that the feature includes a shared messaging service. Call flow 600 may include interactions of a first user device 210-1, a second user device 210-2, account server device 220, feature server device 230, provisioning device 240, and messaging center device 250. In some implementations, user devices 210, account server device 220, feature server device 230, provisioning device 240, and/or messaging center device 250 may use session initiation protocol ("SIP") to create, modify, and/or terminate two party and/or multiparty communication sessions.

As shown in FIG. 6A, and by reference number 610, first user device 210-1 may receive user input (e.g., from a subscriber) indicating that a feature is to be activated for a set of user devices 210. Assume that the subscriber is associated with a business entity, and the set of user devices 210 is associated with employees of the business entity. First user device 210-1 may provide an indication, to account server device 220, that account server device 210 is to add a feature code to the set of user devices 210 (e.g., that account server device 220 is to associate the feature code with the set of user devices 210). Based on receiving the indication, account server device 220 may associate the feature code with a set of MDNs associated with the set of user devices, and may store the association in a data structure (e.g., associated with account server device 220).

As shown by reference number 620, account server device 220 may notify provisioning device 240, that the feature is to be added for the set of user devices 210. The notification may include the association between the set of MDNs (e.g., the set of user devices 210) and the feature code. As shown by reference number 630, provisioning device 240 may notify feature server device 230, that the feature is to be added for the set of user devices 210. The notification may include the association between the set of MDNs and the feature code. As shown by reference number 640, feature server device 230 may store the association (e.g., in a data structure associated with feature server device 230).

In some implementations, account server device 220 may provide a notification (e.g., an email, an SMS text message, etc.) to second user device 210-2 indicating that second user device 210-2 may activate the feature.

As shown in FIG. 6B, and by reference number 650, second user device 210-2 may receive user input (e.g., from a user of second user device 210-2) requesting to activate the feature for second user device 210-2. Second user device 210-2 may provide a request (e.g., to activate the feature) to feature server device 230. As shown by reference number 660, feature server device 230 may receive the request, and may query account server device 220 to validate an MDN associated with second user device 210-2 (e.g., to determine whether second user device 210-2 is associated with a particular account associated with first user device 210-1). Feature server device 230 may receive a notification (e.g., a status), from account server device 220, that second user device 210-2 is associated with the particular account (e.g., the business account associated with the subscriber).

As shown by reference number 670, feature server device 230 may determine whether second user device 210-2 is associated with an appropriate feature code (e.g., the feature code associated with the feature requested by user device 210-2) by checking the association between the set of MDNs and the feature code (e.g., stored in the data structure associated with feature server device 230). Assume that feature server device 230 determines that the MDN associated with second user device 210-2 is one of the set of MDNs, and that the feature requested by second user device 210-2 is the feature identified by the feature code (e.g., associated with the set of MDNs).

As shown by reference number 680, feature server device 230 may notify provisioning device 240 that provisioning device 240 may activate the service for second user device 210-2. As shown by reference number 690, provisioning device 240 may notify messaging center device 250 that messaging center device 250 may activate the feature for second user device 210-2 (e.g., that messaging center device 250 may provide messages, associated with second user device 210-2, to feature server device 230 as part of the shared messaging feature).

As indicated above, FIGS. 6A-6B are provided merely as an example. Other examples are possible and may differ from what was described with regard to FIGS. 6A-6B.

FIG. 7 is a diagram of an example call flow 700 for deactivating a feature for user device 210 of the set of user devices 210 associated with a subscriber. Call flow 700 may include interactions of user device 210-1, account server device 220, feature server device 230, provisioning device 240, and messaging center device 250. In some implementations, user device 210, account server device 220, feature server device 230, provisioning device 240, and/or messaging center device 250 may use session initiation protocol ("SIP") to create, modify, and/or terminate two party and/or multiparty communication sessions.

As shown by reference number 710, first user device 210-1, may provide a request to deactivate a feature associated with a second user device 210-2. As shown by reference number 720, account server device 220 may provide a notification to provisioning device 240. The notification may indicate that the feature is to be removed for second user device 210-2.

As shown by reference number 730, provisioning device 240 may provide an indication to feature server device 230. Based on the indication, feature server device 230 may block the feature for second user device 210-2. Additionally, feature server device 230 may remove the association (e.g., between user device 210-2 and the feature code) from a data structure (e.g., associated with feature server device 230), as shown by reference number 740.

As shown by reference number 750, feature server device 230 may provide a notification to provisioning device 240. The notification may indicate that provisioning device 240 is to provision network 260 such that second user device 210-2 may no longer use the feature. As shown by reference number 760, provisioning device 240 may provide a notification to messaging center device 250, to cause messaging center device 250 to stop providing messages, associated with second user device 210-2, to feature server device 230 as part of the shared messaging feature.

As indicated above, FIG. 7 is provided merely as an example. Other examples are possible and may differ from what was described with regard to FIG. 7.

Figure 8A:
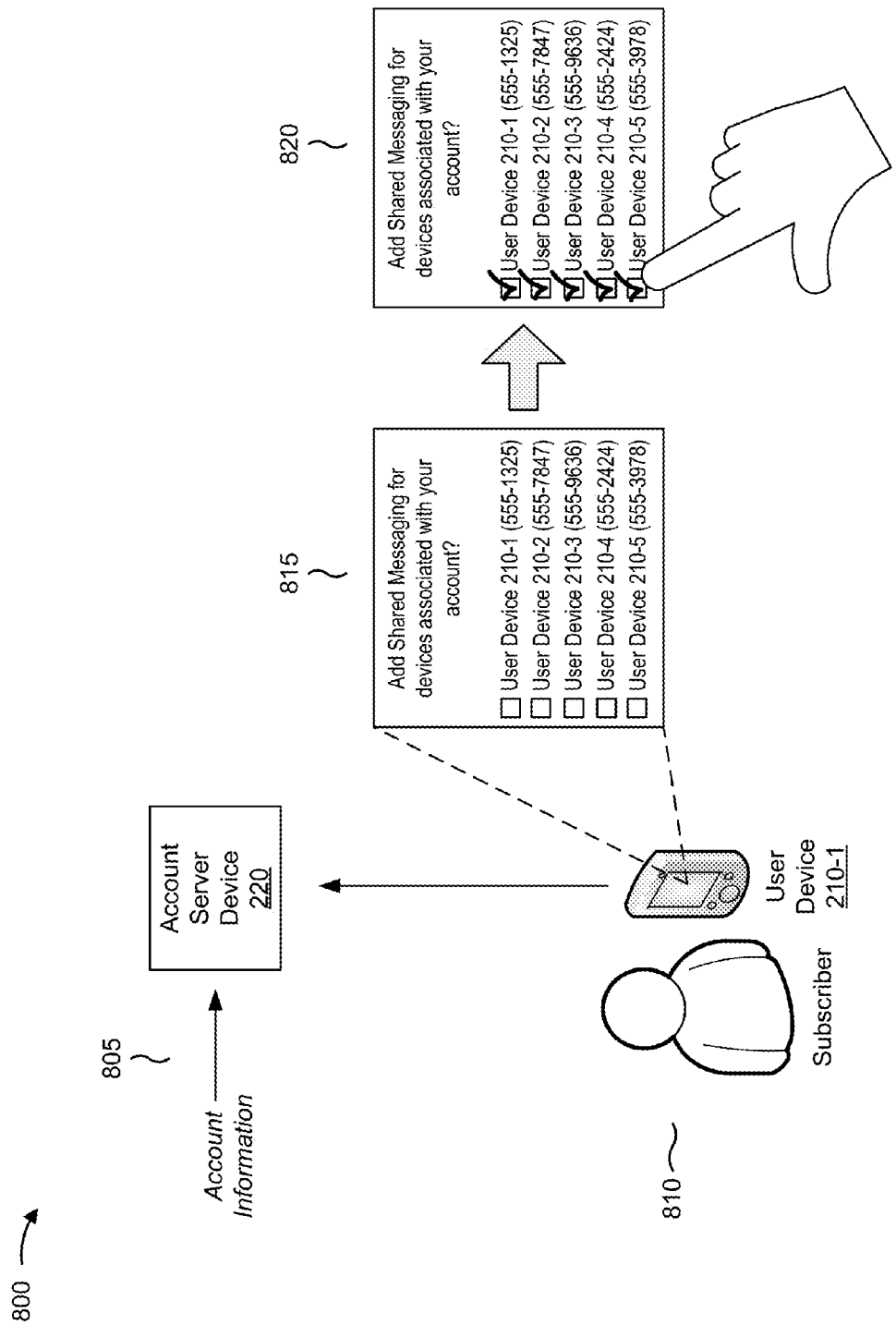
FIGS. 8A-8C are diagrams of an example implementation relating to the example process shown in FIG. 4.
Figure 8B:
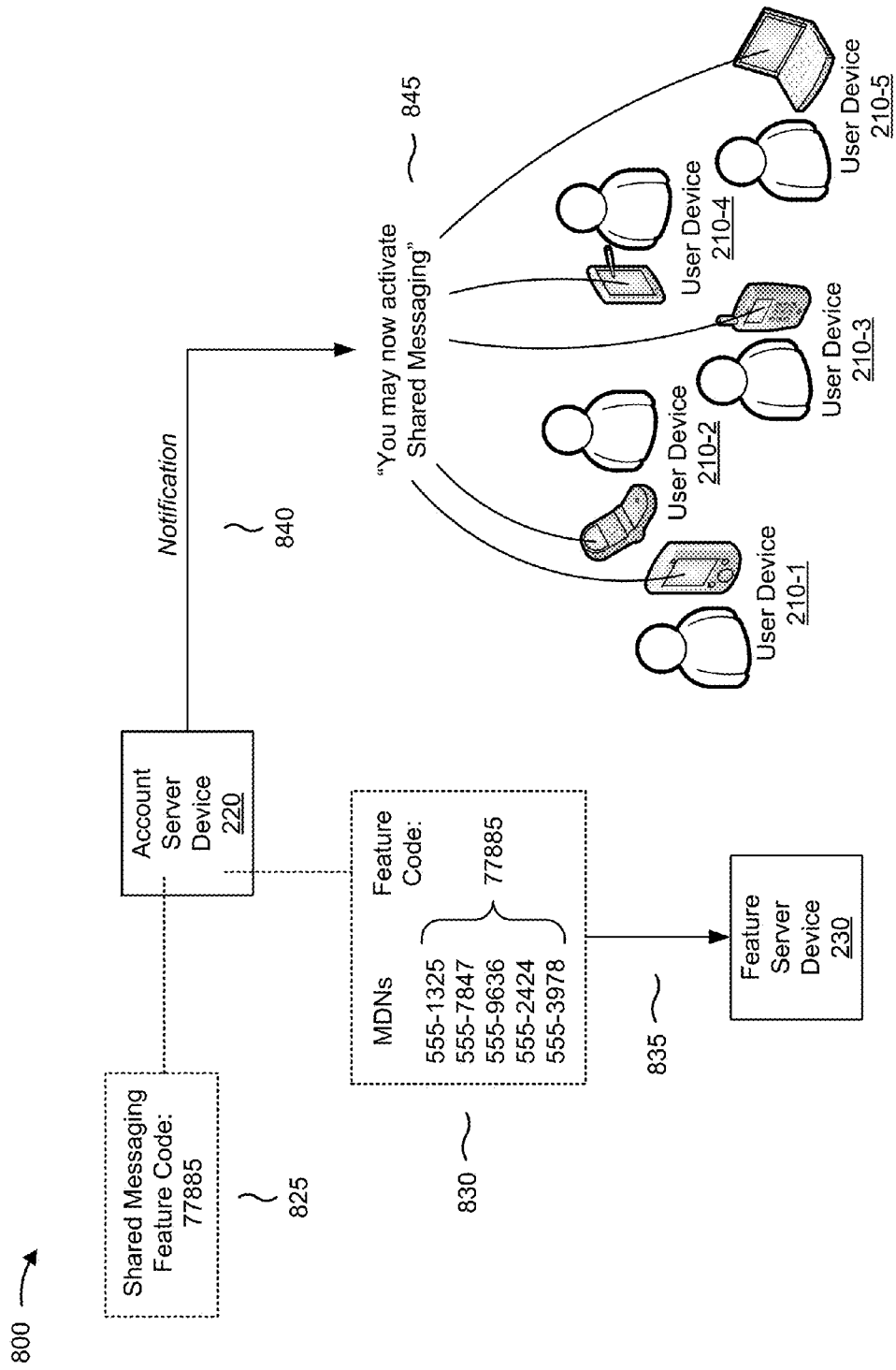
Figure 8C:
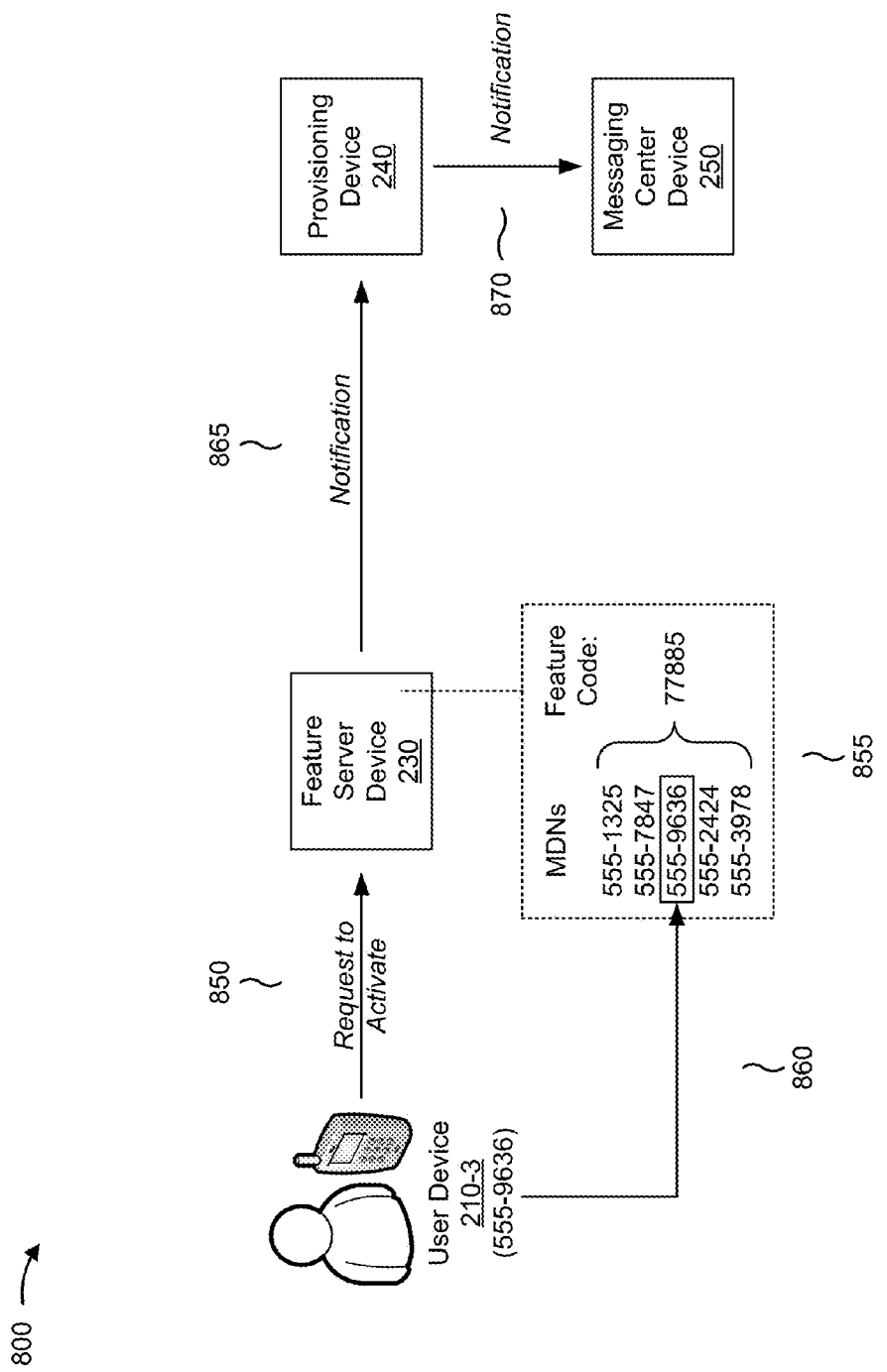

FIGS. 8A-8C are diagrams of an example, implementation 800 relating to process 400 shown in FIG. 4. In example, implementation 800 a subscriber, associated with a business entity, may add a feature to a set of user devices associated with employees of the business entity.

As shown in FIG. 8A, and by reference number 805, account server device 220 may receive account information. The account information may identify a subscriber, associated with a business entity, and a set of user devices 210 associated with an account of the business entity. The set of user devices 210 may include a first user device 210-1 (e.g., associated with the subscriber), a second user device 210-2, a third user device 210-3, a fourth user device 210-4, and a fifth user device 210-5. Second user device 210-2, third user device 210-3, fourth user device 210-4, and fifth user device 210-5 may be associated with employees of the business entity.

As shown by reference number 810, the subscriber may access account server device 220 (e.g., via an account portal) by use of the first user device 210-1. As shown by reference number 815, first user device 210-1 may display information that identifies the set of user devices 210 (e.g., and associated MDNs) via a user interface. First user device 210-1 may display an option to add a feature (e.g., a shared messaging service) to the set of user devices 210. As shown by reference number 820, the subscriber may select (e.g., via the user interface) the set of user devices 210 to receive the feature. First user device 210-1 may provide a request, to account server device 220, that the feature may be activated for the set of user devices 210.

As shown in FIG. 8B, and by reference number 825, account server device 220 may determine a feature code (e.g., "77885") associated with the feature (e.g., the shared messaging service). As shown by reference number 830, account server device 220 may associate the feature code with the set of MDNs (e.g., associated with the set of user devices 210), and may store the association in a data structure associated with account server device 220. As shown by reference number 835, account server device 220 may provide the association to feature server device 230, and feature server device 230 may store the association in a data structure associated with feature server device 230.

As shown by reference number 840, account server device 220 may provide a notification to the set of user devices 210. The notification may indicate that the set of user devices 210 may activate the feature (e.g., the shared messaging service), as shown by reference number 845.

As shown in FIG. 8C, and by reference number 850, third user device 210-3 may send a request (e.g., to activate the feature) to feature server device 230. Third user device 210-3 may send the request based on user input received from a user of third user device 210-3 (e.g., an employee of the business entity). The request may include the MDN associated with third user device 210-3 (e.g., "555-9636"). As shown by reference number 855, feature server device 230 may check the association between the set of MDNs (e.g., associated with the set of user devices 210) and the feature code (e.g., "77885"). As shown by reference number 860, assume that feature server devices 230 determines that the MDN associated with third user device 210-3 is one of the MDNs associated with the feature code.

As shown by reference number 865, feature server devices 230 may send a notification, to provisioning device 240, to cause provisioning device 240 to provision network 260 to permit third user device 210-3 to receive the feature. As shown by reference number 870, provisioning device 240 may send a notification to messaging center device 250, to cause messaging center device 250 to activate the feature for third user device 210-3. Based on the notifications received by provisioning device 240 and messaging center device 250, third user device 210-3 may use the feature (e.g., the shared messaging service). For example, messaging center device 250 may receive messages (e.g., SMS text messages, emails, etc.), and may provide the messages to feature server device 230 (e.g., in addition to providing the messages to third user device 210-3). Feature server device 230 may permit the user of third user device 210-3 to access the messages via another device (e.g., a computer, a tablet, etc.).

As indicated above, FIGS. 8A-8C are provided merely as an example. Other examples are possible and may differ from what was described with regard to FIGS. 8A-8C.

Implementations described herein may allow a subscriber to add and/or remove features for a set of user devices, and may permit a service provider to provision one or more network devices to provide the service to the set of user devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A system, comprising:
one or more server devices to:
receive, using an account server device of the one or more server devices, account information associated with a subscriber and a plurality of user devices;

receive user input, from a device associated with the subscriber, indicating that a feature is to be activated for a subset of user devices,
the plurality of user devices including the subset of user devices,
the subset of user devices being associated with a plurality of mobile device numbers (MDNs), and
the feature being one of a plurality of features;
determine an association between the plurality of MDNs and a feature code,
the feature code uniquely identifying the feature;
receive, from a user device of the plurality of user devices, an MDN associated with the user device to activate the feature,
the plurality of MDNs comprising the MDN;
determine that the user device is among the subset of user devices;
determine that the user device is eligible to receive the feature based on the association between the plurality of MDNs and the feature code and based on the user device being among the subset of user devices; and
send a notification, to a provisioning device, to cause activation of the feature for the user device based on determining that the user device is eligible to receive the feature.

2. The system of claim 1, where the one or more server devices are further to:
provide notifications to the subset of user devices indicating that the subset of user devices are eligible to receive the feature.

3. The system of claim 1, where the one or more server devices, when determining the association between the plurality of MDNs and the feature code, are to:
determine an association between the plurality of MDNs and a plurality of feature codes,
each feature code, of the plurality of feature codes, being associated with a feature, of the plurality of features; and
where the one or more server devices, when determining that the user device is eligible to receive the feature, are to:
determine that the subset of user devices is eligible to receive the plurality of features based on the association between the plurality of MDNs and the plurality of feature codes.

4. The system of claim 1, where the feature includes access to a shared messaging service; and
where the one or more server devices are further to:
provide information to a network device to permit the user device to access the shared messaging service.

5. The system of claim 1, where the feature includes access to media;
where the one or more server devices are further to:
provide information to a network device to permit the user device to access the media.

6. The system of claim 1, where the one or more server devices are further to:
receive an association between a plurality of features and a plurality of feature codes,
the plurality of features including the feature, and
the plurality of feature codes including the feature code; and
determine the feature code based on the association between the plurality of features and the plurality of feature codes.

7. The system of claim 1, where the feature includes service related to at least one of: cellular service, voicemail, email, short message service (SMS) text message, call forwarding, conference calling, or call blocking.

8. A non-transitory computer-readable medium storing instructions, the instructions comprising:
one or more instructions that, when executed by one or more processors, cause the one or more processors to:
receive, using an account server device, account information associated with a subscriber and a plurality of user devices,
the plurality of user devices being associated with a plurality of mobile device identifiers numbers (MDNs);
receive user input, from a device associated with the subscriber, indicating that a feature is to be activated for a subset of user devices,
the user input including a single interaction of the subscriber,
the feature being among a plurality of features, and
the plurality of user devices including the subset of user devices;
determine an association between the plurality of MDNs and a feature code,
the feature code uniquely identifying the feature;
receive, from a user device of the subset of user devices, an MDN associated with the user device to activate the feature;
determine that the user device is eligible to receive the feature based on the association between the plurality of MDNs and the feature code; and
send a notification, to a provisioning device, to cause activation of the feature for the user device based on determining that the user device is eligible to receive the feature.

9. The non-transitory computer-readable medium of claim 8, where the one or more instructions, that cause the one or more processors to determine that the user device is eligible to receive the feature, cause the one or more processors to:
determine that the user device is eligible to receive the feature based on determining that the MDN is one of the plurality of MDNs.

10. The non-transitory computer-readable medium of claim 8, where the feature includes access to audio files;
where the one or more instructions, when executed by the one or more processors, further cause the one or more processors to:
provide information to a network device to permit the user device to access the audio files.

11. The non-transitory computer-readable medium of claim 8, where the feature includes access to a navigation system;
where the one or more instructions, when executed by the one or more processors, further cause the one or more processors to:
provide information to a network device to permit the user device to access the navigation system.

12. The non-transitory computer-readable medium of claim 8, where the one or more instructions, that cause the one or more processors to receive the MDN, cause the one or more processors to:
receive the MDN based on an attempt by the user device to access the feature.

13. The non-transitory computer-readable medium of claim 8, where the one or more instructions, when executed by the one or more processors, further cause the one or more processors to:
receive an indication that the feature is to be deactivated for the plurality of user devices;

remove the association between the plurality of MDNs and the feature code; and provide information, that identifies that the association is removed, to a network device to cause the network device to prevent the subset of user devices from accessing the feature.

14. The non-transitory computer-readable medium of claim 8, where the one or more instructions, when executed by one or more processors, further cause the one or more processors to:

determine an association between a subset of MDNs and a second feature code, a second subset of user devices being associated with the subset of MDNs, the plurality user devices including the second subset of user devices, and a second feature code being associated with a second feature, the plurality of features including the second feature;

receive a request to activate the second feature from a second user device, the second subset of user devices including the second user device; and determine a second user device is eligible to receive the second feature based on the association between the subset of MDNs and the second feature code.

15. A method, comprising:

receiving, by one or more devices using an account server device, account information associated with a subscriber and a plurality of user devices;

receiving, by the one or more devices, user input, from a device associated with the subscriber, indicating that a feature is to be activated for a subset of user devices, the feature being among a plurality of features, and the plurality of user devices including the subset of user devices;

determining, by the one or more devices, an association between a plurality of mobile device numbers (MDNs) and a feature code, the subset of user devices being associated with the plurality of MDNs, and the feature code uniquely identifying the feature;

receiving, by the one or more devices and from a user device of the subset of user devices, an MDN associated with the user device to activate the feature;

determining, by the one or more devices, that the user device is eligible to receive the feature based on the association between the plurality of MDNs and the feature code; and providing, by the one or more devices and to a provisioning device, a notification to cause a network device to activate the feature for the user device, the notification being provided based on determining that the user device is eligible to receive the feature.

16. The method of claim 15, where providing the notification to cause the network device to activate the feature comprises:

providing the notification to a particular user device associated with the subscriber, the notification indicating that the feature is activated for the user device.

17. The method of claim 15, where the feature includes a data limit;

where providing the notification to cause the network device to activate the feature comprises:

providing the notification to the network device to permit the user device to transmit or receive data in an amount based on the data limit.

18. The method of claim 15, where the user device is a first user device; and the method further comprising:

receiving a request to activate the feature for a second user device; and determining that the second user device is not eligible to receive the feature based on the association between the plurality of MDNs and the feature code.

19. The method of claim 18, where determining that the second user device is not eligible comprises:

determining that a device identifier associated with the second user device is not one of the plurality of MDNs.

20. The method of claim 18, further comprising:

providing a notification to the second user device indicating that the second user device is not eligible to receive the feature.

* * * * *